(12) United States Patent
Draxelmayr

(10) Patent No.: US 6,242,905 B1
(45) Date of Patent: Jun. 5, 2001

(54) METHOD FOR IDENTIFYING THE DIRECTION OF ROTATION OF A WHEEL USING HALL PROBES

(75) Inventor: Dieter Draxelmayr, Villach (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/426,422

(22) Filed: Oct. 25, 1999

Related U.S. Application Data

(63) Continuation of application No. PCT/DE98/01140, filed on Apr. 23, 1998.

(51) Int. Cl.[7] ............................. G01B 7/30; H01L 43/06
(52) U.S. Cl. ................ 324/165; 324/207.2; 324/207.25; 340/672
(58) Field of Search ..................... 324/207.12, 165, 324/207.2, 207.21, 207.25, 207.26; 341/111; 340/672

(56) References Cited

U.S. PATENT DOCUMENTS

| | | | |
|---|---|---|---|
| 5,241,267 | 8/1993 | Gleixner | 324/207.2 |
| 5,489,844 | 2/1996 | Preston | 324/207.12 |

FOREIGN PATENT DOCUMENTS

| | | |
|---|---|---|
| 8909677 | 6/1990 | (DE) . |
| 4104902A1 | 8/1992 | (DE) . |
| 61-160011 | 7/1986 | (JP) . |
| 5-288763A | 11/1993 | (JP) . |
| 08110348A | 4/1996 | (JP) . |

*Primary Examiner*—Christine Oda
*Assistant Examiner*—Henry S. Andersen
(74) *Attorney, Agent, or Firm*—Herbert L. Lerner; Laurence A. Greenber; Werner H. Stemer

(57) ABSTRACT

A method of identifying a direction of rotation of a wheel using Hall probes which are disposed about the circumference of the wheel. In this case, a first, a second and a third Hall probe are disposed successively, so that the second Hall probe lies between the first and third Hall probes. From the output signals of the three Hall probes, two evaluation signals are obtained, through comparison of which the direction of rotation of the wheel is determined.

3 Claims, 3 Drawing Sheets

METHOD FOR IDENTIFYING THE DIRECTION OF ROTATION OF A WHEEL USING HALL PROBES

CROSS-REFERENCE TO RELATED APPLICATION

This application is a continuation of copending International Application PCT/DE98/01140, filed Apr. 23, 1998, which designated the United States.

BACKGROUND OF THE INVENTION

Field of the Invention

The present invention relates to a method of identifying the direction of rotation of a wheel using Hall probes which are disposed about the circumference of the wheel, via evaluation signals phase-shifted relative to one another.

In a large number of cases, it is desirable to detect not only the position and speed of a rotating wheel, for example a gearwheel, but also the direction of rotation of the wheel. In general, a sensor that is capable of establishing the position, speed and direction of rotation of a wheel is thus sought.

For detecting the position and speed of a gearwheel, there is already a differential dynamic Hall sensor which measures the difference field between two spatially offset Hall probes and gives especially good results if the phase angle between the two signals produced by the two Hall probes is 180°. This is because, in this case, one Hall probe lies over a tooth of the gearwheel, while the other Hall probe lies over a gap between two teeth of the gearwheel. With such a differential dynamic Hall sensor, however, it is not possible to identify the direction of rotation of the gearwheel.

This is because in order to identify the direction of rotation of a gearwheel as well, yet another item of phase information is necessary, and this can be made available by two Hall sensors offset by 90° relative to one another.

German Utility Model DE 89 09 677 U1 discloses a device for identifying rotation in which digital signal sequences are respectively derived from at least three Hall probes by at least two differential Hall ICs. For accurate rotational speed identification, with a view to higher resolution, the frequency of the output signal can be doubled relative to that of only one single differential Hall IC. By phase comparison, it is in principle also possible to identify the direction of rotation.

Published, Non-Prosecuted German Patent Application DE 41 04 902 A1 discloses a method and a configuration for identifying a direction of motion, in particular a direction of rotation. To that end, two signals, phase shifted by 90°, which are derived from two receivers disposed offset in the direction of motion of a signal source, are formed by adding and subtracting the output signals. From the sign of the 90° phase shift between the sum and difference signals, the direction of rotation can be uniquely determined. This method is, however, highly sensitive to DC magnetic fields. There is therefore an offset in the sum signal relative to the difference signal, which is twice as great as the DC magnetic field, with the result that reliable further processing of these signals entails serious difficulties.

SUMMARY OF THE INVENTION

It is accordingly an object of the invention to provide a method for identifying the direction of rotation of a wheel using Hall probes which overcomes the above-mentioned disadvantages of the prior art methods of this general type, which allows reliable identification of the direction of rotation without having to demand exact coordination between the tooth spacing and the Hall probe spacing. In particular, the method is intended to be insensitive to DC magnetic fields.

With the foregoing and other objects in view there is provided, in accordance with the invention, a method of identifying a direction of rotation of a wheel, which includes:

disposing Hall probes including a first Hall probe, a second Hall probe and a third Hall probe in succession in a circumferential direction about the wheel, the second Hall probe is disposed between the first Hall probe and the third Hall probe, the first through third Hall probes generating output signals phase-shifted relative to one another;

deriving a first evaluation signal and a second evaluation signal from the output signals of the Hall probes, an output signal of the third Hall probe being subtracted from an output signal of the first Hall probe to obtain the first evaluation signal, and the output signal of the first Hall probe being added to the output signal of the third Hall probe resulting in a summed value and two times an output signal of the second Hall probe being subtracted from the summed value to obtain the second evaluation signal;

sampling one of the first evaluation signal and the second evaluation signal at predetermined sample times resulting in a tested evaluation signal being sampled and the other of the first evaluation signal and the second evaluation signal being a sampling evaluation signal defining the predetermined sample times; and deriving a trend or sign of the tested evaluation signal being sampled, the trend or sign having a direction of rotation definitively assigned to it with reference to the tested evaluation signal sampled at a respective sample time.

In order to implement the method, a first, a second and a third Hall probe are disposed in such a way that the second Hall probe is positioned between the first and third Hall probes. Two evaluation signals, shifted by 90°, are obtained from the output signals of the first to third Hall probes, there preferably being a change in sign of the second evaluation signal in relation to the first evaluation signal when the direction of rotation changes.

The second Hall probe advantageously lies exactly midway between the first and third Hall probes, since the oscillation amplitudes of the evaluation signals are then at a maximum.

The method therefore requires only three Hall probes, which can be fitted in one Hall sensor. Using this sensor, the direction of rotation, for example of a gearwheel, can be determined reliably from a change in a sign of the second evaluation signal.

Other features which are considered as characteristic for the invention are set forth in the appended claims.

Although the invention is illustrated and described herein as embodied in a method for identifying the direction of rotation of a wheel using Hall probes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 5:
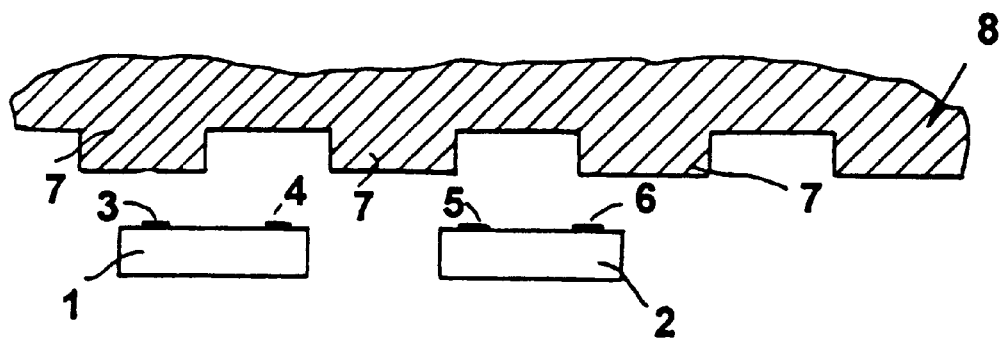
FIG. 5 is a fragmented, sectional view of two Hall sensors according to the prior art.

In all the figures of the drawing, sub-features and integral parts that correspond to one another bear the same reference symbol in each case. Referring now to the figures of the drawing in detail and first, particularly, to FIGS. 5 and 6 thereof, there is shown according to the prior art two differential dynamic Hall sensors 1, 2 with two Hall probes 3, 4 and 5, 6 each disposed offset relative to one another by one-fourth tooth spacing in relation to teeth 7 of a gearwheel 8. In this manner, output signals 9, 10 that are shifted relative to one another by one-fourth period are obtained from the Hall sensors 1 and 2 and represented in FIG. 6. A trailing edge of the output signal 9 of the Hall sensor 1 is used to sample the output signal 10 of the Hall sensor 2. In the case of signals 9, 10 running from left to right for one direction of rotation of the gearwheel 8 in FIG. 6, the trailing edge of the output signal 9 then always coincides with a positive value of the output signal 10 of the Hall sensor 2, as is indicated by arrows 11.

If the direction of rotation of the gearwheel 8 is then reversed, then the phase relation also changes. This can be thought of in terms of "time" now running backward, so that the output signals 9, 10 in FIG. 6 occur from right to left. If the output signal 10 of the Hall sensor 2 is then again sampled with the trailing edge of the output signal 9 of the Hall sensor 1, then a signal that is always negative is obtained, since the trailing edge always coincides with a negative value of the output signal 10, as is indicated by arrows 12 in FIG. 6.

From the sign of the signal obtained by sampling the output signal 10 with the output signal 9, it is thus possible to assess the direction of rotation of the gearwheel 8. It can also be seen that a configuration of the Hall sensors 1, 2 offset by 90° is optimum since a maximum signal to noise ratio is then obtained.

Figure 1:
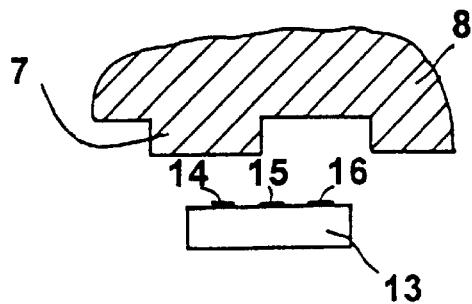
FIG. 1 is a diagrammatic, fragmented sectional view of a sensor already known according to the prior art.
Figure 2:
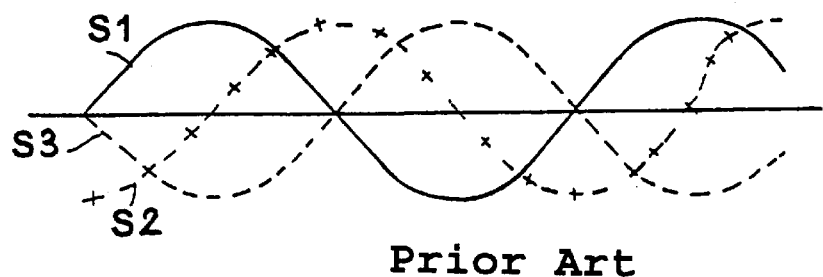
FIG. 2 is an illustration showing output signals of Hall probes of the prior art sensor.

FIG. 1 shows another known Hall sensor 13, which has Hall probes 14, 15 and 16 that are disposed in the direction of rotation of the gearwheel 8, the Hall probe 15 being provided mid-way between the Hall probes 14 and 16. When the gearwheel 8 rotates, the Hall probes 14 to 16 deliver output signals S1 to S3 (see FIG. 2), which are approximately sinusoidal and will therefore be treated as such below. The Hall sensor 14 thus delivers the output signal S1 which has a maximum value when the tooth 7 moves past the Hall sensor 14, while a gap between the teeth 7 gives a minimum value for the output signal S1. The same is true for the output signal S2 of Hall probe 15, and for the output signal S3 of Hall probe 16.

Figure 6:
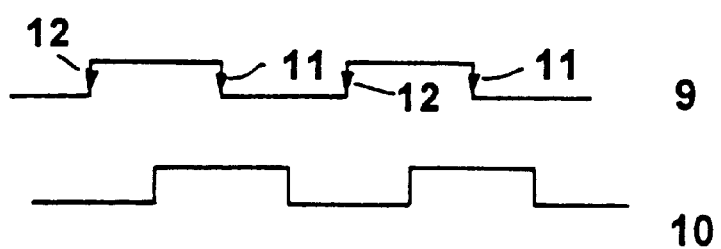
FIG. 6 is an illustration of output signals of the two prior art Hall probes.

The output signals S1 to S3 can be digitized straightforwardly with the aid of a comparator, so that the signals S1 to S3 take on a profile corresponding to the output signals 9 and 10 in FIG. 6. It should, however, be assumed below that the signals are processed further in an analog mode.

In the method according to the invention, a first evaluation signal A is obtained from subtraction of the output signal S3 from the output signal S1. Likewise, a second evaluation signal B is obtained from addition of the output signal S3 to the output signal S1 and subtraction of two times the output signal S2 from this sum. In other words, the following relationships are satisfied for the evaluation signals A and B:

$$A=S1-S3 \quad B=S1+S3-2 \cdot S2 \qquad (1)$$

The sinusoidal profile assumed above is then taken for the signals S1 to S3, signal S2 being shifted by phase p and signal S3 being shifted by phase 2p relative to signal S1.

With t=time and w=angular velocity of the gearwheel 8, the following is obtained:

$$S1=\sin(w \cdot t) \quad S2=\sin(w \cdot t+p) \quad S3=\sin(w \cdot t+2 \cdot p) \qquad (2)$$

From the system of equations (2), after a few rearrangements with the aid of equations (1) the following relationships are derived:

$$A=-2 \cdot \sin(p) \cdot \cos(w \cdot t+p) \qquad (3)$$

$$B=2 \cdot (\cos(p)-1) \cdot \sin(w \cdot t+p) \qquad (4).$$

From equations (3) and (4) it can be seen that the two evaluation signals A and B always have a phase shift of 90° relative to one another irrespective of the value of the phase p. Therefore, irrespective of whether the Hall sensor 13 exactly matches the gearwheel 8, there is always a 90° "phase system" in which at the zero crossing of the oscillation of one evaluation signal the oscillation of the other evaluation signal takes on its maximum. For example, for a rising zero crossing of the evaluation signal A the value $\cos(w \cdot t+p)=0$ is found, while the evaluation signal B then contains the value $\sin(w \cdot t+p)=1$.

It is nevertheless advantageous to have the best possible coordination between the spacing of the Hall probes of the Hall sensor 13 and the spacings of the teeth 7 of the gearwheel 8, since the oscillation amplitudes of the evaluation signals A and B then take on their maximum.

If, as explained above, it is then considered that reversing the direction of rotation of the gearwheel 8 corresponds to changing the time sign, then the following relationships are obtained from equations (3) and (4):

$$A=-2 \cdot \sin(p) \cdot \cos(w \cdot t-p) \qquad (5)$$

$$B=-2 \cdot \cos((p)-1) \cdot \sin(w \cdot t-p) \qquad (6)$$

The signals resulting from this are thus very similar to the signals corresponding to equations (3) and (4), the only difference being in the negative sign in signal B. Therefore, however, that on sampling at the zero crossing of signal A, the sign of signal B is inverted compared with before when the direction of rotation is reversed, so that unique directional identification can be established from the sign of evaluation signal B in relation to evaluation signal A. In terms of circuitry, this can for example be embodied with a D flip-flop, in which, after digitizing, signal A is applied to the clock input and signal B to the D input.

The method is, however, not restricted to sampling at the zero crossing of signal A. The sampling can also take place at other values of signal A. Likewise, as an alternative to the direction identification with the aid of the sign of signal B, the direction identification may take place by evaluating the trend of the second evaluation signal B at the sample value. In particular in the case of sinusoidal evaluation signals, however, sampling at the zero crossing of signal A in conjunction with the direction identification with the aid of the sign of signal B represents a particularly preferred method.

Further, one of the evaluation signals (A, B) can be employed to produce switching edges, and the respective other evaluation signal (A, B) can be sampled with these switching edges, the direction of rotation being determined from the relationship between the sample values of the edges.

The method thus allows for reliable identification of the reversal of the direction of rotation of a gearwheel with merely three Hall probes on a Hall sensor.

Figure 3:
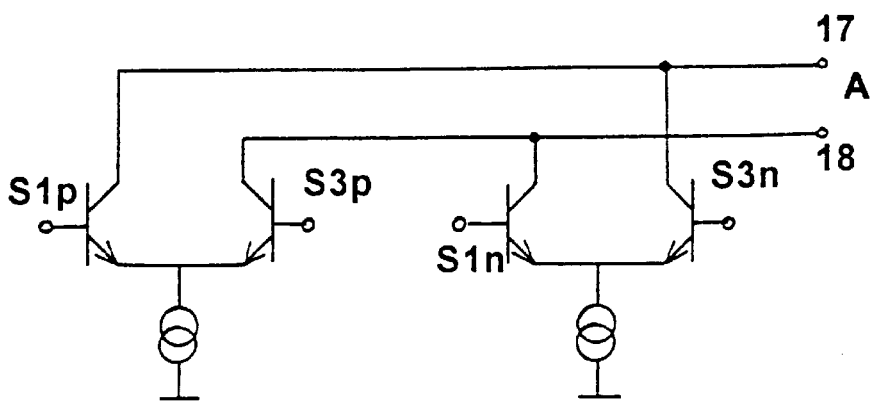
FIGS. 3 and 4 are circuit diagrams of evaluation electronics for obtaining output signals according to the invention.
Figure 4:
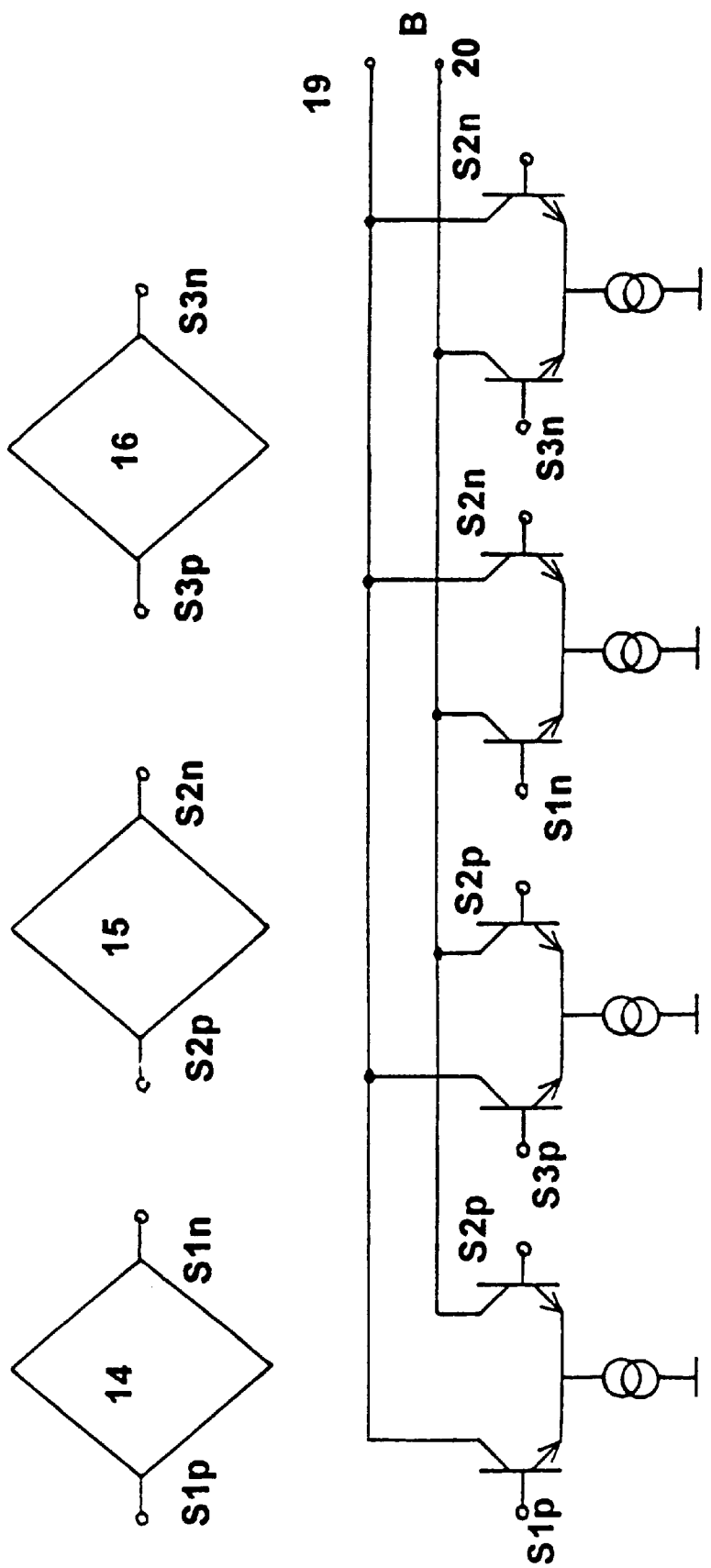

For producing the evaluation signals A and B, operational amplifier circuits can in principle be readily used. Transistor circuits are, however, also possible, as shown in FIGS. 3 and 4. In FIGS. 3 and 4, S1p and S1n indicate the output signals of the Hall probe 14, S2p and S2n the output signals of the Hall probe 15, and S3p and S3n the output signals of the Hall probe 16.

In the circuit of FIG. 3, the output signal A is obtained using the output terminals 17 and 18, while with the circuit of FIG. 4 the evaluation signal B is obtained using the output terminals 19 and 20.

In the circuits of FIGS. 3 and 4, the Hall probes 14, 15, 16 are interconnected with the respective differential amplifiers of the circuits in such a way that only difference fields are employed as a drive, while a large superimposed magnetic bias voltage causes only an in-phase shift which is effectively suppressed without significant side effects.

Circuits which are similar to the circuits shown in FIGS. 3 and 4 have already been described. It is, of course, also possible to employ other circuits for obtaining the evaluation signals A and B, in respect of which the corresponding operational amplifier circuits have already been mentioned above.

I claim:

1. A method of identifying a direction of rotation of a wheel, which comprises:

disposing Hall probes including a first Hall probe, a second Hall probe and a third Hall probe in succession in a circumferential direction of the wheel, the second Hall probe disposed between the first Hall probe and the third Hall probe, the first through third Hall probes generating output signals phase-shifted relative to one another;

deriving a first evaluation signal and a second evaluation signal from the output signals of the Hall probes, an output signal of the third Hall probe being subtracted from an output signal of the first Hall probe to obtain the first evaluation signal, the output signal of the first Hall probe being added to the output signal of the third Hall probe resulting in a summed value and two times an output signal of the second Hall probe being subtracted from the summed value to obtain the second evaluation signal;

sampling one of the first evaluation signal and the second evaluation signal at predetermined sample times resulting in a tested evaluation signal being sampled and the other of the first evaluation signal and the second evaluation signal being a sampling evaluation signal defining the predetermined sample times; and deriving a trend of the tested evaluation signal being sampled, the trend having a direction of rotation definitively assigned to it with reference to the tested evaluation signal sampled at a respective sample time.

2. The method according to claim 1, wherein the output signals, the first evaluation signal and the second evaluation signal are sinusoidal signals.

3. The method according to claim 1, which comprises:

sampling the tested evaluation signal at a zero crossing of the sampling evaluation signal; and testing a sign of the tested evaluation signal, the sign respectively having the direction of rotation definitively assigned to it with reference to the tested evaluation signal at a corresponding sample time.

* * * * *